United States Patent [19]

Nienhuis et al.

[11] Patent Number: 5,112,240
[45] Date of Patent: May 12, 1992

[54] ELECTRIFIED WALL PANEL SYSTEM

[75] Inventors: James H. Nienhuis, Wyoming; Jeffrey L. Clark, Holland; Michael L. De Pree, Hamilton; Robert L. Beck, Zeeland, all of Mich.

[73] Assignee: Herman Miller, Inc., Zeeland, Mich.

[21] Appl. No.: 638,211

[22] Filed: Jan. 7, 1991

Related U.S. Application Data

[60] Division of Ser. No. 526,064, May 18, 1990, Pat. No. 5,013,252, which is a continuation-in-part of Ser. No. 467,267, Jan. 18, 1990, abandoned.

[51] Int. Cl.⁵ ............................................. H01R 25/00
[52] U.S. Cl. ................................... 439/215; 439/211; 439/654
[58] Field of Search ........................ 439/207, 209–212, 439/214–218, 222, 224, 654

[56] References Cited

U.S. PATENT DOCUMENTS

| | | | |
|---|---|---|---|
| Re. 31,733 | 11/1984 | Haworth et al. | 439/31 |
| 1,189,435 | 7/1916 | Edmands | 439/457 |
| 1,718,252 | 5/1927 | Putnam | 439/209 |
| 2,039,982 | 5/1936 | Schaller | 439/209 |
| 2,292,394 | 8/1942 | O'Brien | 439/209 |
| 2,305,100 | 12/1942 | O'Brien | 439/31 |
| 3,529,389 | 9/1970 | Wilkins | 439/209 |
| 3,683,101 | 8/1972 | Liberman | 174/49 |
| 3,762,116 | 10/1973 | Anderson et al. | 52/239 |
| 3,856,981 | 12/1974 | Boundy | 174/48 |
| 4,043,626 | 8/1977 | Propet et al. | 439/215 |
| 4,056,297 | 11/1977 | Gartung | 174/48 |
| 4,270,020 | 5/1981 | Kenworthy et al. | 439/215 |
| 4,313,646 | 2/1982 | Millhimes et al. | 439/215 |
| 4,367,370 | 1/1983 | Wilson et al. | 439/215 |
| 4,370,008 | 11/1983 | Haworth et al. | 439/31 |
| 4,740,167 | 4/1988 | Millhimes et al. | 439/654 |
| 4,775,328 | 10/1988 | McCarthy | 439/211 |
| 4,781,609 | 11/1988 | Wilson et al. | 439/215 |
| 4,992,058 | 2/1991 | Tanner | 439/211 |
| 5,035,636 | 7/1991 | Hollingsworth | 439/215 |
| 5,041,002 | 8/1991 | Byrne | 439/211 |

FOREIGN PATENT DOCUMENTS 47852  7/1965  Luxembourg .

Primary Examiner—Gary F. Paumen
Attorney, Agent, or Firm—Willian Brinks Olds Hofer Gilson & Lione

[57] ABSTRACT

There is disclosed an electrified wall panel system having a power distribution server locatable within a wall panel unit. The power distribution server has four receptacle module ports oriented in an H-shaped configuration in which a first receptacle port on a first side of the wall panel unit opens toward a first end of the wall panel unit, a second receptacle port on the first side of the wall panel unit opens toward a second end of the wall panel unit, a third receptacle port on a second side of the wall panel unit opens toward the first end of the wall panel unit, and fourth receptacle port on the second side of the wall panel unit opens toward the second end of the wall panel unit. First and second harnesses are each electrically connected at first ends thereof to the power distributon server, extend to opposite ends of the wall panel unit, and include connector ports on the second ends thereof for providing electrical interconnection of adjacent wall panel units. There is also disclosed an electrified wall panel system with wall panel connector interchangeably usable with the interconnection of two, three, and four wall panel units. The connector includes a hook member for connecting together adjacent vertical members of frames of adjacent wall panel units at a lower portion thereof and a draw nut for connecting together adjacent vertical members of frames of adjacent wall panel units at an upper portion thereof by vertical displacement thereof.

5 Claims, 8 Drawing Sheets

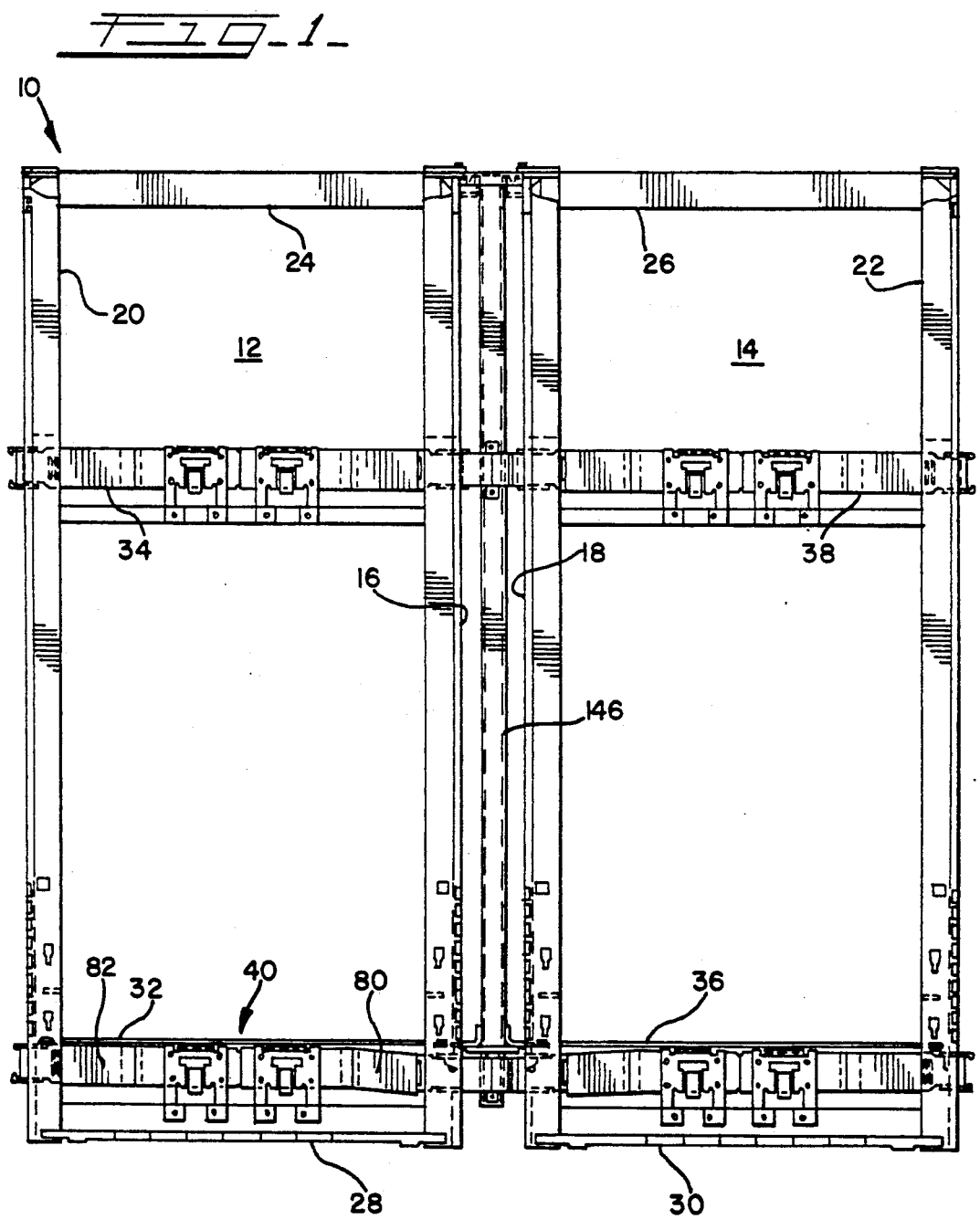

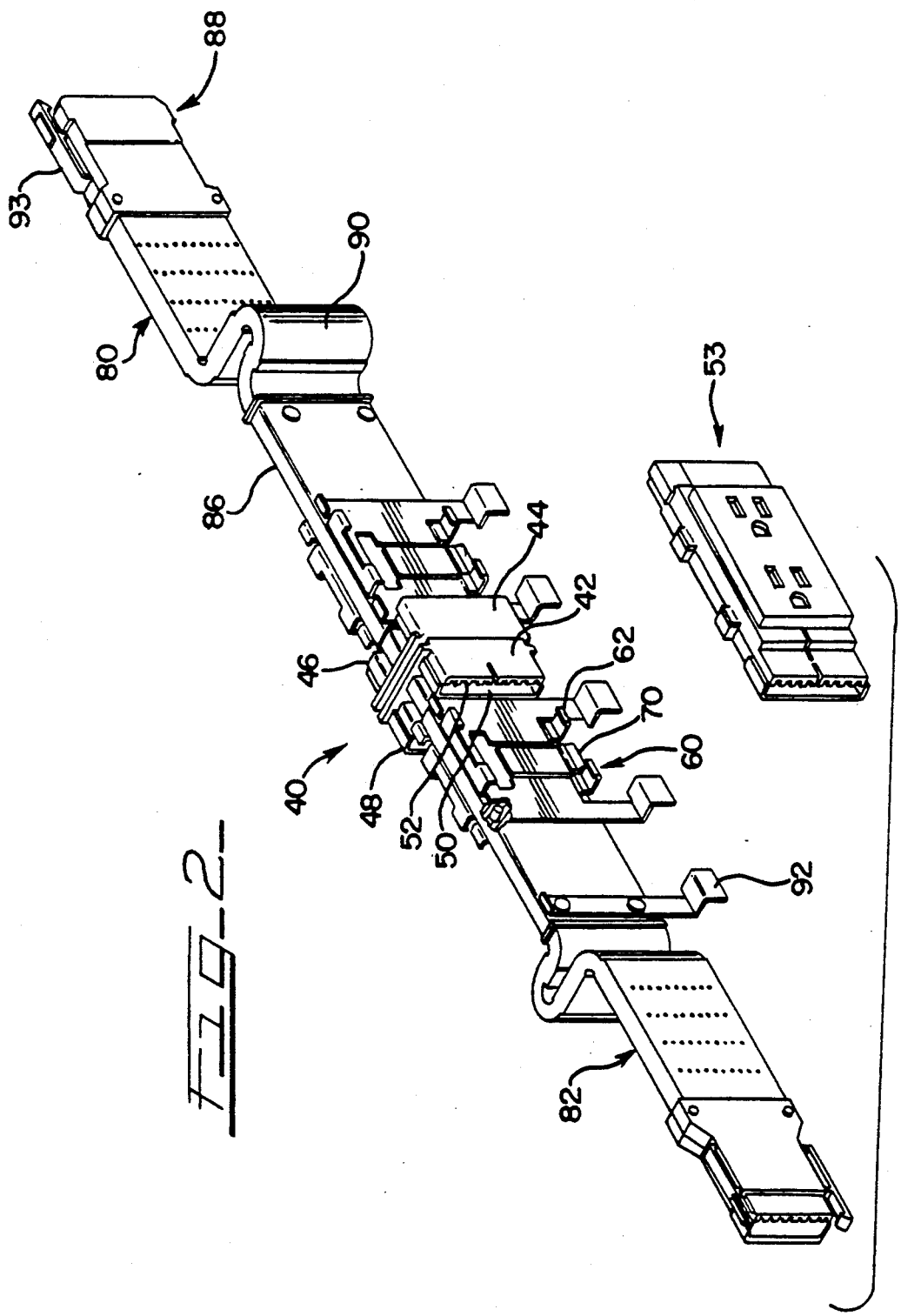

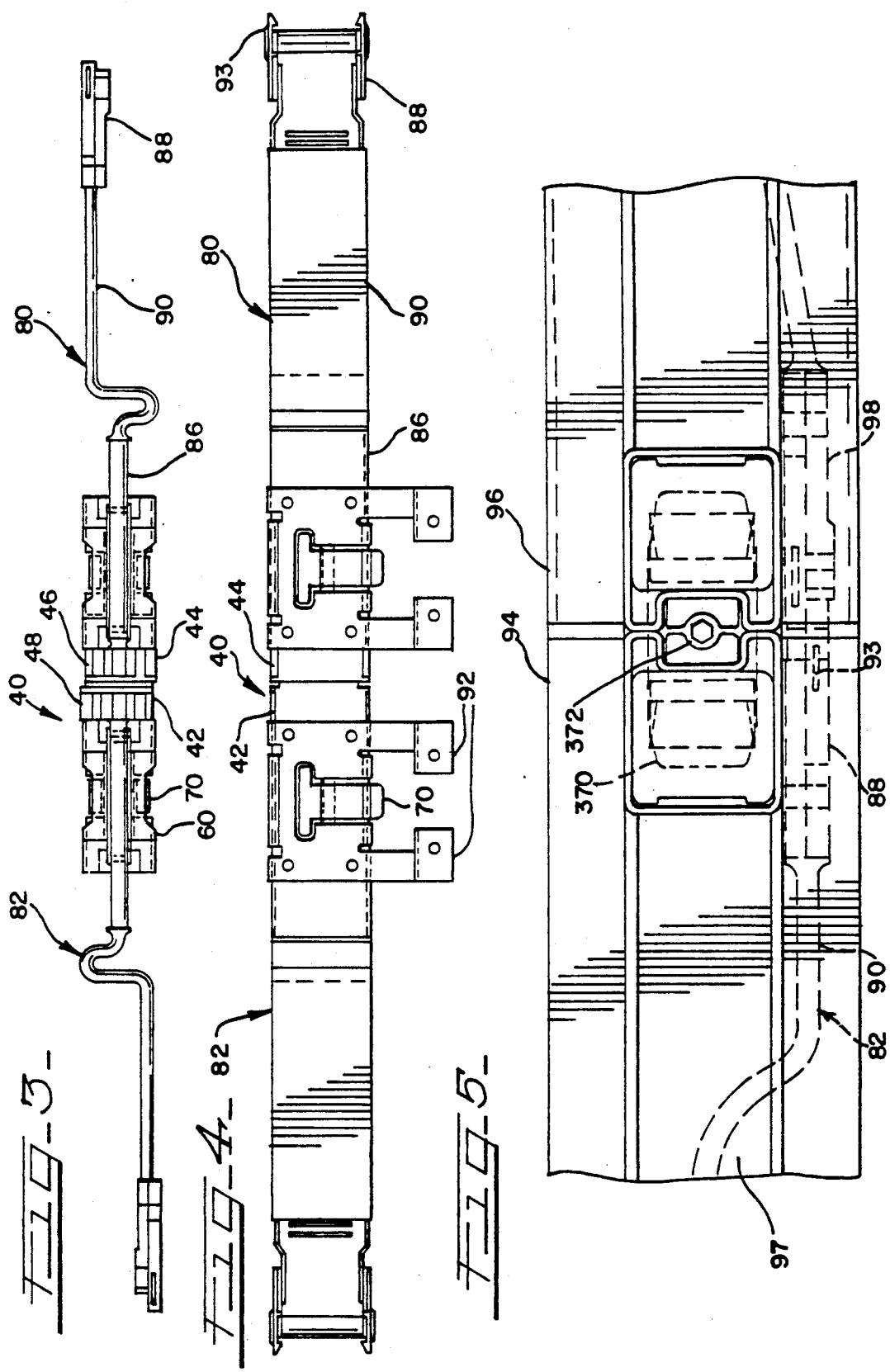

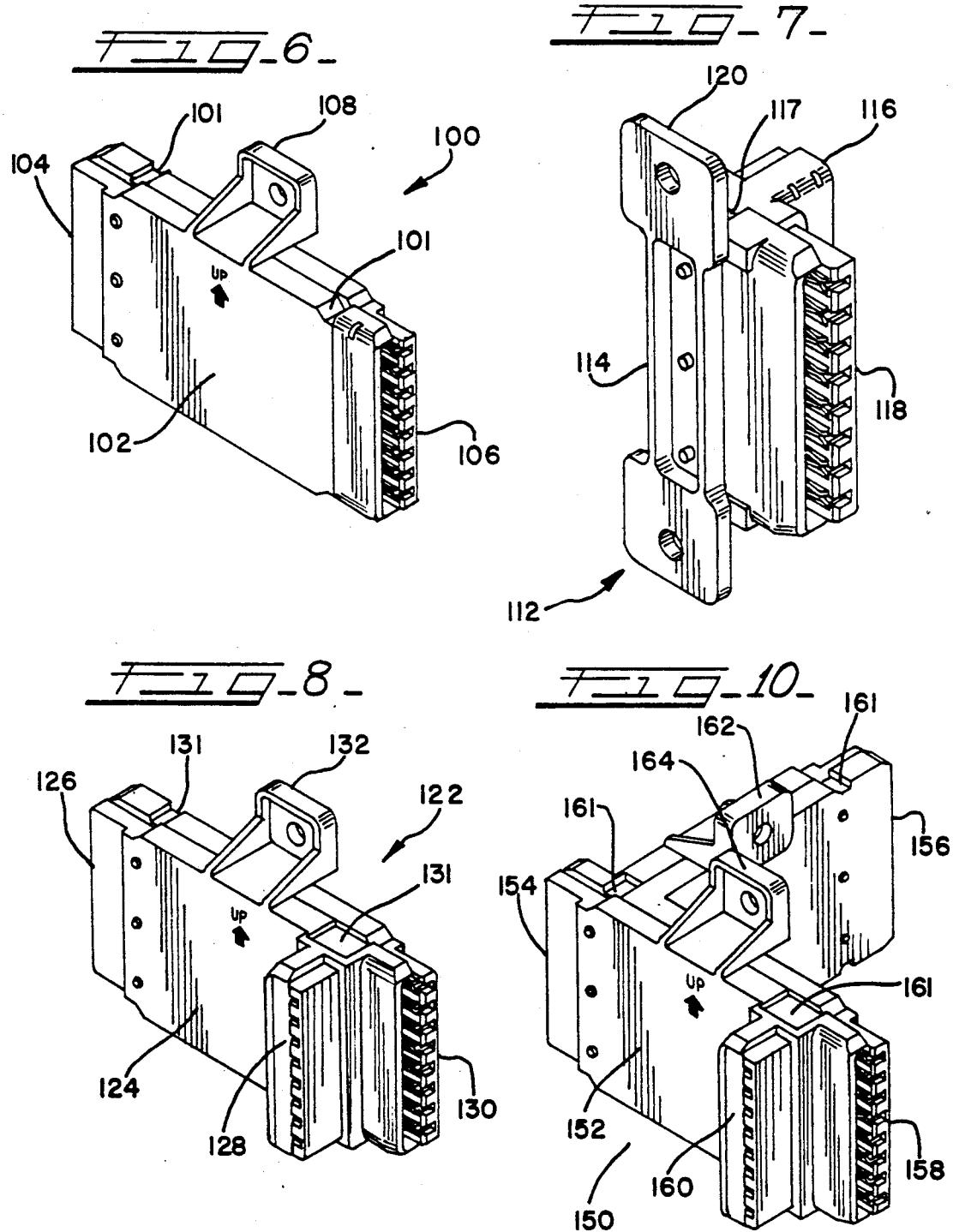

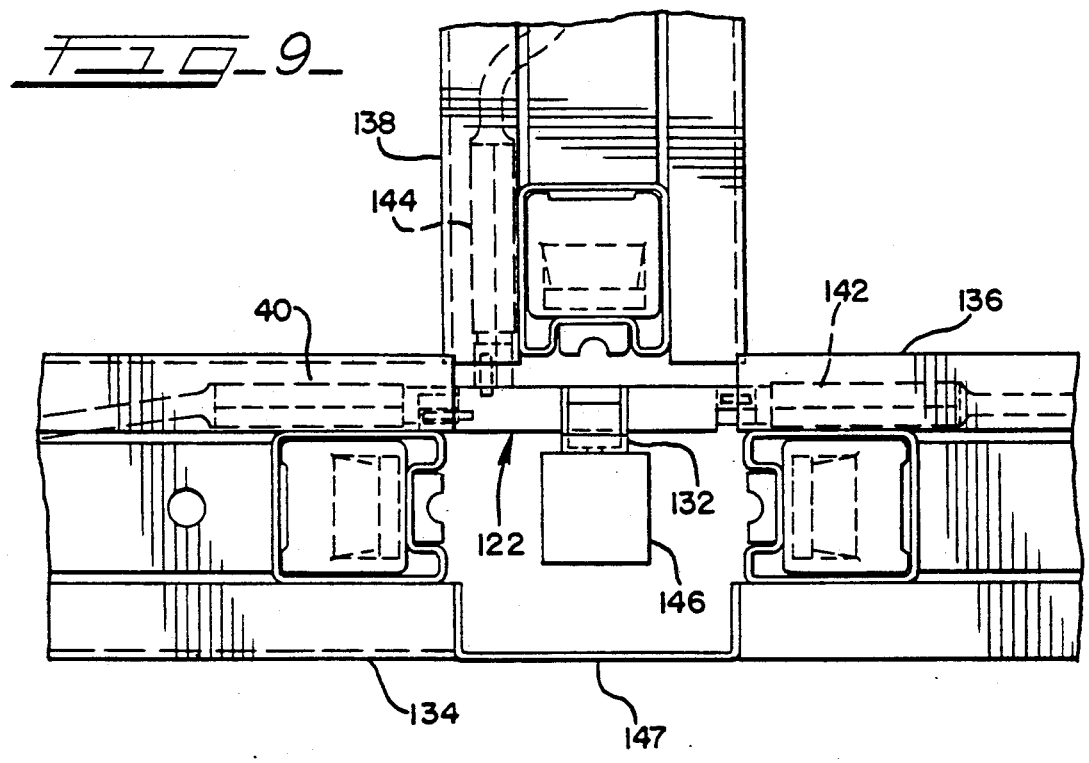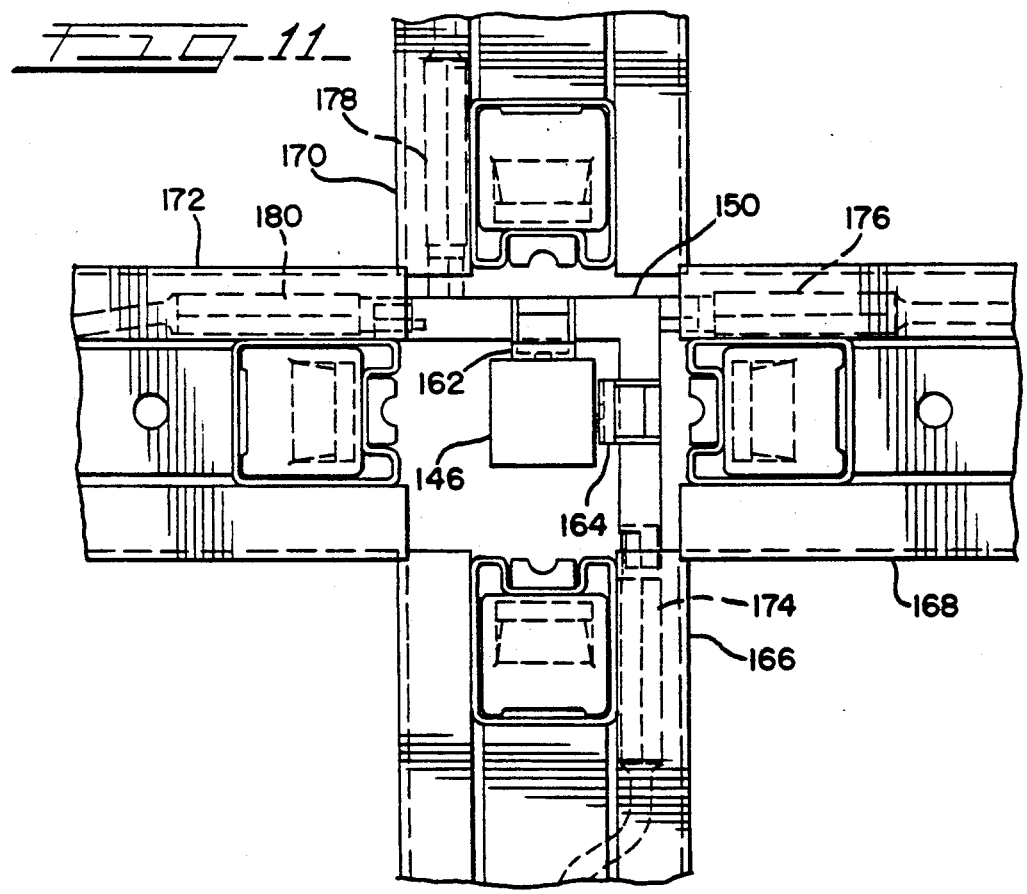

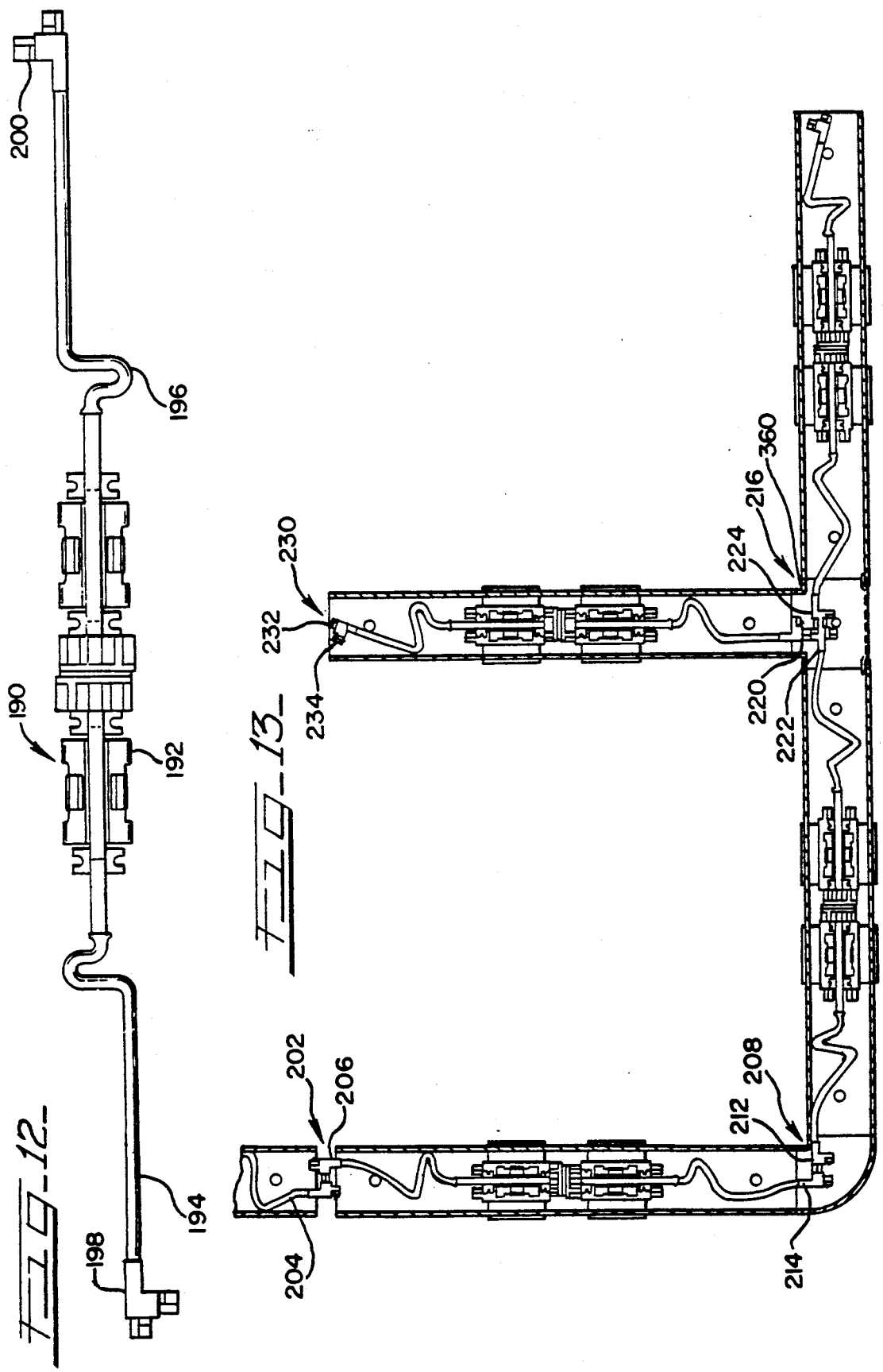

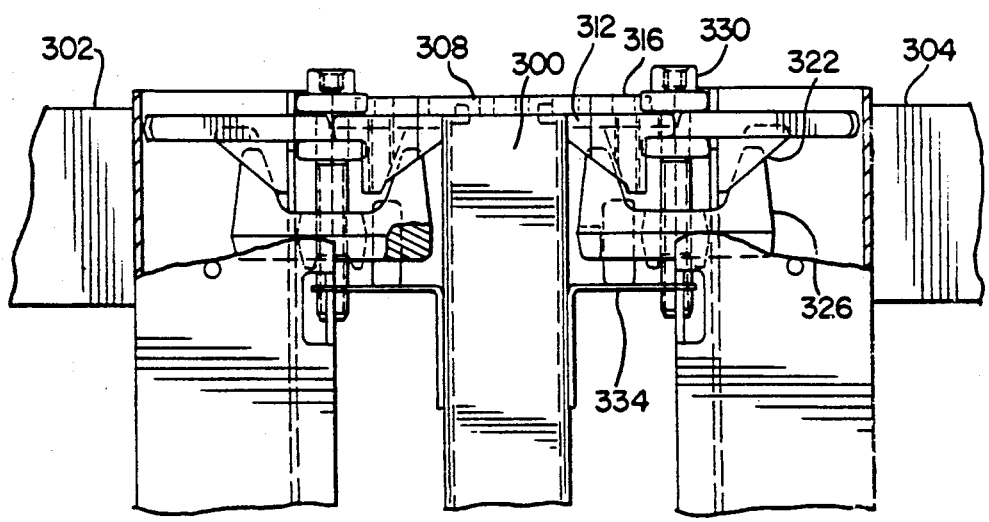
FIG_14
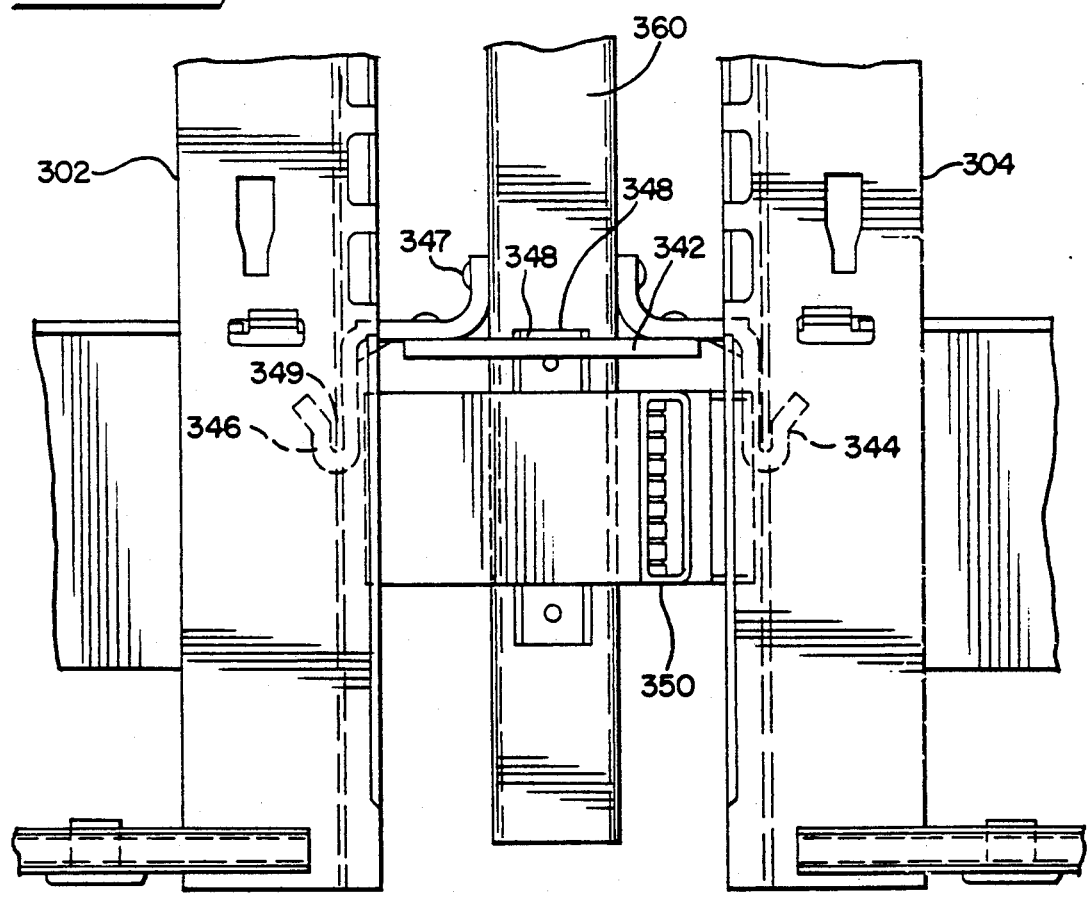
FIG_15

ELECTRIFIED WALL PANEL SYSTEM

This application is a divisional of application Ser. No. 526,064, filed May 18, 1990, now U.S. Pat. No. 4,013,252, which was a continuation-in-part of Ser. No. 467,267, filed Jan. 18, 1990, now abandoned.

In using wall panel systems it is essential to provide electricity to workstations located in and around the wall panel units. Present demands for electrical power consumption may require the provision of several circuits through a wall panel system. Present demands may even require the use of one or more isolated circuits that do not share a neutral or ground wire with other circuits in order to minimize electrical interference that might cause problems for computer or communication systems. Accordingly, it is desirable that an electric distribution system be provided with the wall panel system that is easy to install yet provides a high level of electrical service.

Related to the feature of ease of installation is reconfigurability. Wall panel systems may be preferred over permanent wall structures because of the relative ease with which such systems can be reconfigured to adapt to the needs of a changing or expanding business. In particular, where a wall panel system is of high quality and durable, it is possible that at some point during the use of the wall panel system, the user's need will change and a reconfiguration of the wall panel system will be desired. In such a case, it would be advantageous to have an electrical distribution system that can also be easily reconnected and reconfigured at the user's site either in the event of a reconfiguration of the wall panel system or in order to provide a different level of electric service to an existing wall panel system.

Different types of electrical distribution systems are provided for use with wall panel units. One previous wall panel system that included an electrical distribution system provides electrical receptacles at the lower bottom corners of the wall panels. In such a configuration, electrical receptacles may not always be easily accessible. For example, where wall panel units meet in a corner, the electrical receptacles may be out of reach. Moreover an electrical connection between the corner receptacles through the interior of the wall panel must be provided Accordingly, it is an object of the present invention to provide an electrified wall panel system in which the electrical receptacles are readily and conveniently accessible.

It is a further object of the present invention to provide a multi-circuit electric distribution system for wall panels that minimizes the number of different parts and components.

It is still another object of the present invention to provide an electrified wall panel system that can be readily and easily reconfigured and reassembled.

It is still another object of the present invention to provide an electrified wall panel system that can provide a high level of electric service yet is flexible so that it can be readily and easily assembled and reassembled without requiring substitution of different parts or components.

SUMMARY OF THE INVENTION

According to a first aspect of the invention, there is provided an electrified wall panel system including at least one wall panel unit with a first and second side and a first and second end. This wall panel unit is connectable at the first and second ends thereof to other wall panel units.

A power distribution server is provided which includes four receptacle module ports oriented in an H-shaped configuration. In particular, a first receptacle module port on the first side of said wall panel unit sopens toward the first end of said wall panel unit a second receptacle module port on the first side of the wall panel unit opens toward the second end of said wall panel unit, a third receptacle module port on the second side of said wall panel unit opens toward the first end of said wall panel unit and a fourth receptacle module port on the second side of said wall panel unit opens toward the second end of said wall panel unit.

The system also includes a first harness electrically connected at one end to the power distribution server This first harness is of a length to extend to the first end of said wall panel unit and includes on its other end a harness end connector port.

The system further includes a second harness electrically connected at one end to said power distribution server on the side of said power distribution server opposite said first harness. This second harness is of a length to extend to the second end of said wall panel unit, and includes on its other end a harness end connector port.

In accordance with another aspect of the invention, there is provided an electrified wall panel system including at least two wall panel units. The system also includes wall panel unit connector with means for releasably connecting adjacent ends of said two wall panel units. This wall panel unit connector also may include a vertical skeletal post within said wall panel unit connector and housing means which is spaced apart from the skeletal post.

Power distribution means are provided within each of the two wall panel units with a harness which extends to the end of the wall panel unit.

The system further includes an inter-panel electrical connector with at least a first and second connector port matable with harness end connector ports for electrically connecting the harnesses of the two wall panel units. This inter-panel electrical connector includes attaching means for releasable attachment to the skeletal post so as to be disposed within the housing means. Advantageously, the inter-panel connector means can attached at various heights along the skeletal post.

BRIEF DESCRIPTION OF THE DRAWINGS

FIG. 1 is an interior view of two adjacent wall panel units that represent part of a wall panel system of one embodiment of the present invention.

FIG. 2 is a perspective view of a portion of the power distribution server of another embodiment of the present invention.

FIG. 3 is a top view of the embodiment of the power distribution server and harnesses of the present invention as depicted in FIG. 1.

FIG. 4 is a side view of the embodiment depicted in FIG. 3.

FIG. 5 is an interior top view of a wall panel junction with an embodiment of the present invention depicted therein.

FIG. 6 is a perspective view of a further embodiment of the present invention.

FIG. 7 is a perspective view of still another embodiment of the present invention.

FIG. 8 is a perspective view of yet another embodiment of the present invention.

FIG. 9 is an interior top view of a three-way wall panel junction with an embodiment of the present invention depicted therein.

FIG. 10 is a perspective view of another embodiment of the present invention.

FIG. 11 is an interior top view of a four-way wall panel junction with an embodiment of the present invention depicted therein.

FIG. 12 is a top view of an embodiment of the present invention.

FIG. 13 is a top view of several wall panel junctions showing the embodiment of the present invention depicted in FIG. 12.

FIG. 14 is a side view of the top end of an interconnection in accordance with an embodiment of the present invention between adjacent wall panel units with portion of the wall panel units cutaway.

FIG. 15 is a side view of the bottom end of the interconnection depicted in FIG. 14.

DETAILED DESCRIPTION OF THE PRESENTLY PREFERRED EMBODIMENTS

Figure 16:
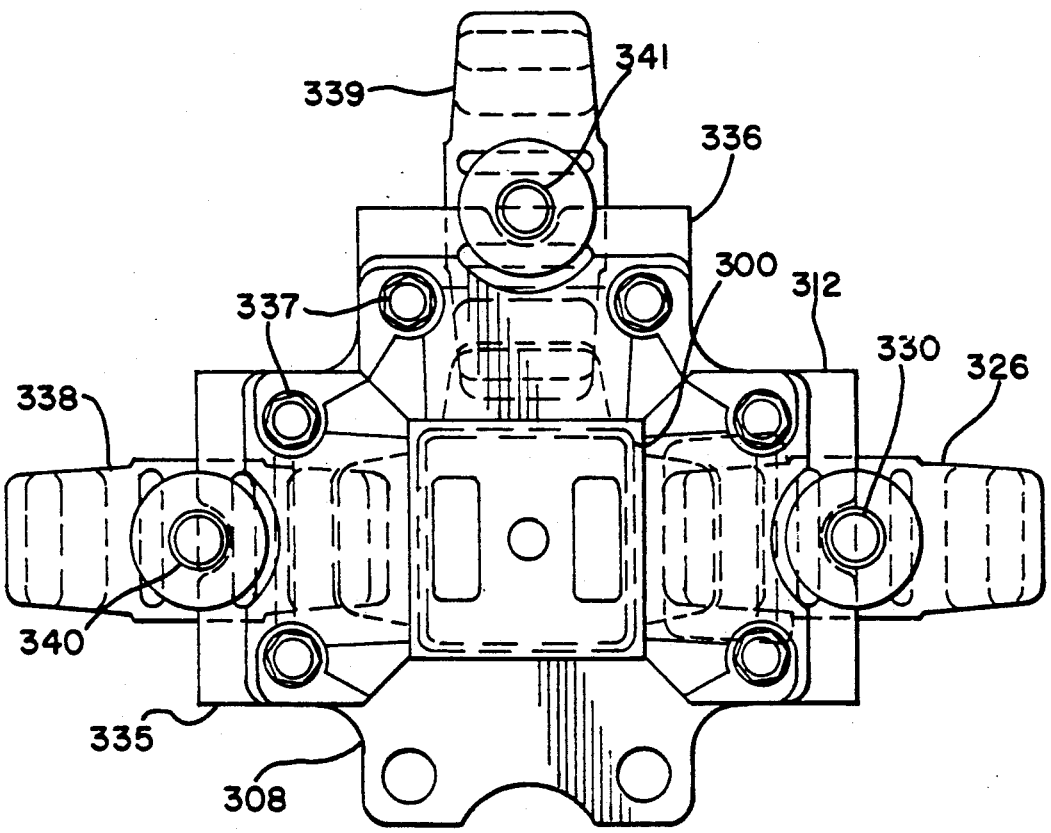
FIG. 16 is a top view of the interconnection depicted in FIG. 14.

Referring to FIG. 1 there is depicted a portion of an electrified wall panel system 10 represented by two wall panel units 12 and 14. Wall panel units 12 and 14 may be similar or identical to each other, such as depicted in FIG. 1, or may be of different sizes (e.g., different heights or widths) depending upon the application. Wall panel units 12 and 14 are depicted connected longitudinally at ends 16 and 18, respectively.

Wall panel units may be made of a solid core material such as wood fiber that is then covered with a various other materials such as a fabric Wall panel units may also be made of frames covered with tiles. The present invention may be used with panels of either type or with any combination thereof. For purposes of the description herein the wall panel units will be described as being constructed of frames and tiles although it is understood that the wall panel units of other types may also be used.

Wall panel units 12 and 14 in this first preferred embodiment include frames 20 and 22, respectively which may be made of a metal or other rigid structural material. The frames 20 and 22 also typically include top rails 24 and 26 and bottom rails 28 and 30. The bottom rails 28 and 30 may include legs or stands for placing the wall panel units on the floor. Each wall panel unit may include a panel insert, i.e. the tile (not shown), that attaches to the frame thereby defining the wall. Panel tiles may be made of various materials, including fabrics, that are durable and provide privacy and noise-reducing properties. Also, there may be included a baseboard cover (also not shown) along the lower portion of the wall panel unit The baseboard cover may be made of a hard, durable material such as metal or plastic. The wall panel units may be connected together by means of hardware associated with the frame or by means of separate pieces as explained below.

In order to convey electrical service among the wall panel units, electric wire or cabling is run through the wall panel units For this purpose, the cabling may be run through or around the frame members of the wall panel unit, or behind the baseboard covers or through one or more horizontal access passageways, e.g. channels, designed to be part of the wall panel unit. For purposes of this embodiment, the access passageways includes the spaces between the tiles with provision for access through the frame members. To the extent necessary, brackets may also be provided to define the passageways and support the cabling and any accessories associated therewith.

Where the wall panel units are constructed of solid panels, the passageways may take the form of channels formed at one or more specific heights. In addition, with solid panel wall units the passageway for the cabling may be formed by mounting the solid wall panel on narrow stilts.

In the embodiment of FIG. 1 the wall panel units 12 and 14 each include two horizontal access passageways through the frames 20 and 22, although fewer or more than two may be provided. The wall panel unit 12 includes a lower access passageway channel 32 and a belt line passageway 34. The wall panel unit 14 includes a lower passageway 36 and a belt line passageway 38. The lower passageways 32 and 36 are alignable as are the belt line passageways 34 and 38. The purpose of having these passageways at various heights is for the provision of electrical service both near the floor (via the passageways 32 and 36) and at a belt line (via the passageways 34 and 38 which may correspond to desk level). Depending on the electrical service requirements, additional passageways can be provided in wall panel units (or space can otherwise be provided through wall panel units) for the provision of electrical service. Electrical service is provided to the wall panel units by a power distribution server 40 (also referred to as a power block) The power distribution server 40 is located in the passageway 32 approximately centrally between the ends of the wall panel unit 12.

Power entry to the cabling in the wall panel units may be provided by various means For example, an electrical connection to the cabling in the wall panel units may be provided by ceiling entry devices (in which a junction box is located above a suspended ceiling), floor entry devices (in which a junction box is located beneath the floor), hard wiring from the building supply, or plug-in devices that can directly engage or be plugged into the cabling.

Referring to FIG. 2, in the preferred embodiment, the power distribution server 40 includes four receptacle ports 42, 44. 46 and 48. In the preferred embodiment, the ports 42 and 44 are adjacent to each other and open toward one side of the wall panel unit, but are oriented toward opposite ends of the wall panel unit. The ports 46 and 48 are also adjacent to each other but open to the opposite side of the wall panel unit. Ports 46 and 48 also are oriented toward opposite ends of the wall panel unit As viewed from the top (e.g. FIG. 3) the ports on the power distribution server 40 form an "H-shaped" configuration. Each of these ports includes an opening such as opening 50 in port 42, into which a receptacle module can be engaged.

As shown in FIG. 2 opening 50 has contact channels (such as contact channel 52) located within port 42 and stacked vertically. In this embodiment, there are eight contact channels stacked vertically Corresponding to these channels 52 are contacts located internally in the port 42 that can be engaged electrically by a receptacle module 53. The receptacle module 53 provides a conventional grounded duplex outlet. With the embodiment depicted in FIG. 2, four separate circuits can be provided by the power distribution server 40. The separate circuits correspond to different channels in the port 42. Each of these circuits includes a hot wire, a neutral wire, and a ground wire although the neutral and ground wires can be shared between circuits in certain circumstances. Provision may also be made for an isolated or dedicated circuit that minimizes electrical interference. An isolated or dedicated circuit may be particularly suitable for computer or communications applications.

Like the port 42, the receptacle module 53 includes eight channels which correspond to and matingly engage the eight contact channels 52. However the receptacle module 53 includes only three contacts internal to these channels the other five channels in the receptacle module are blank (i.e. empty). The three contacts are associated with one of the four provided circuits in accordance with a wiring convention established with the design of the wall panel system. For example, in this embodiment, wires associated with each channel (from bottom to top) are circuit A (hot), circuit B (hot, circuit C (hot), circuit D (hot), circuits A, B, C, (ground), circuit D (isolated ground), circuits A, B, C, (neutral), and circuit D (isolated neutral). According to this feature, four circuits are available at each port. The selection of which of the four circuits is made by choosing a receptacle module corresponding to the circuit desired Typically, the module is labelled on its front With a letter indicating which circuit it supports (e.g. "c"). That receptacle module will include contacts in the appropriate channels corresponding to the circuit desired. For example, if circuit "c" is desired the receptacle module chosen will have contacts in the third, fifth, and seventh channels (from the bottom) appropriately wired to the receptacle module sockets.

Although the embodiment described above is provided with four circuits (of which one is an isolated circuit), the present invention could be adapted to provide more than four circuits by the addition of further channels Furthermore, the wiring convention for the channels described above could be modified or adapted such as may be required for the provision of additional circuits.

In this embodiment the four hot wires are #12 wire, the combined neutral is #10, the common ground is #12, the isolated neutral is #10 and the isolated ground is #12. Other sizes may be used depending upon the power requirements.

In this embodiment a receptacle module can be engaged in port 42 by sliding in a lateral direction into the opening 50. The baseboard cover of the wall panel unit (not shown) will include openings corresponding to the size and position of receptacle modules for access thereto. Not all ports of the power distribution server need to be used and blank covers can be used with the baseboard cover to conceal unused receptacle module ports.

Further included in the power distribution server 40 is a receptacle module retaining means 60 The retaining means 60 may take the form of the brackets 62 that prevent the outward movement of a receptacle module retained in port 42. A locking means such as latch 70 associated with the retaining means 60 can secure the receptacle module in the retaining bracket 62. Other locking means could be adapted for use, such as springs, pins bolts, fasteners, links, or the like In the embodiment depicted in FIG. 2, the receptacle module can be removed by pressing down on the latch 70 thereby allowing the receptacle module to be removed from port 42 by sliding first in a lateral direction away from port 42 and then out from the brackets 62.

In the preferred embodiment, the power distribution server 40 also includes a pair of wire harnesses 80 and 82. The harnesses 80 and 82 provide for connection to an electric source and also to adjacent power distribution servers in adjacent wall panel units The harnesses 80 and 82 each have eight wires therein.

Referring to FIG. 3, there is shown a top view of an embodiment of the power distribution server 40 including the harnesses 80 and 82. The harness 80 includes an interior connection member 86 that passes between the ports 44 and 46 to make an electrical connection with all the ports of the power distribution server 40. The harness 80 is of a length to reach to the end of the wall panel unit in which it is located in order to make connection with an adjacent power distribution server or a similar connector. In this manner, electrical service can be provided by interconnection of power distribution servers.

Harness 80 is provided with a harness end connector port 88 for the purpose of making this interconnection. The harness 80 also includes a flexible middle portion 90 between the harness end connector port 88 and the interior connection member 86. In this embodiment there is sufficient room around where the flexible middle portion 90 is located so that harness 80 can be adaptively adjusted at the end of the wall panel unit to make appropriate connection to adjacent harnesses as necessary. For example because the middle portion 90 is flexible, the harness end connector port 88 can be retracted inside the edge of the wall panel unit if no further connection to the wall panel unit will be made or for shipment or storage. Alternatively, the harness end connector port 88 can be retracted out of the edge of the wall panel unit in order to make further connection to an adjacent wall panel unit either during assembly or reassembly.

FIG. 4 shows a side view of the power distribution server 40 of FIG. 3. The power distribution server 40 may be connected to the wall panel unit by means of brackets, such as the brackets 92. The brackets 92 are provided for engaging the frame of a wall panel unit to position and align the power distribution server in the wall panel unit. Alternatively the power distribution server may be connected to the wall panel unit by means of brackets that suspend the power distribution server 40. Other types and configurations of bracket hardware can be used.

The harness end connector port 88 is provided with one or more latching arms 93. The latching arms 93 are preferably formed of the molded material of the harness end and are flexibly resilient. Each of the latching arms 93 includes a hooked end that engage a notch in either another harness end connector or another type of connector, as explained below.

Electrical connection between adjacent wall panel units can be accomplished in different ways. Referring to FIG. 5, there is depicted a longitudinal connection between two wall panels units 94 and 96. The harness 82 extends through the access way 97 in the wall panel unit 92 to the end thereof The flexible harness section 90 is depicted bending to circumvent a wall panel frame. The harness end connector port 88 connects to an adjacent harness end connector port 98. Direct coupling of two adjacent harness end connector ports may be made when the wall panel units are aligned longitudinally. The latching arms 93 of the harness end connector port 88 engage a notch (not shown) in the adjacent harness end connector port 98.

Referring to FIG. 6, there is depicted another means for interconnecting the harnesses of two adjacent power distribution servers In this embodiment of the invention, an inter-panel electrical connector 100 is used to connect the harnesses of adjacent power distribution servers. The inter-panel electrical connector depicted in FIG. 6 is of the two-way 180Φ type. This inter-panel electrical connector 100 has a body 102 and harness connector ports 104 and 106 that are adaptable with the ports on the harnesses. An attaching means, such as bracket 108 (which may be molded thereto) may be provided for attaching the inter-panel electrical connector 100 to the wall panel units or portions thereof (or a skeletal member, as explained below) at various heights in the wall panel unit. In addition, the inter-panel electrical connector 100 includes notches 101 that engage a latching arm of a harness end connector port.

In FIG. 7, an inter-panel electrical connector 112 of the two-way 90Φ type is shown. This inter-panel electrical connector 112 is used for making an electrical connection between two wall panel units aligned at their ends in a right angle, such as at a corner. This inter-panel electrical connector 112 has a body 114 and harness connector ports 116 and 118. Like the 180Φ connector the 90Φ inter-panel electrical connector 112 may also include an attaching means, such as bracket 120, for attaching to a wall panel unit (or post, as described below). The inter-panel electrical connector 112 also includes a notch 117 for engaging a latching arm of a harness end connector port.

Where three wall panel units meet, such as in a T-configuration, a three-way inter-panel electrical connector may be used to distribute electricity among the three wall panel units. Referring to FIG. 8, an inter-panel electrical connector of the three-way type 122 is shown. The inter-panel electrical connector of the three-way type 122 has a body 124 and three harness connector ports 126, 128 and 130. The harness connector ports 126 and 130 are aligned in a 180Φ orientation and the harness connector port 128 is oriented 90Φ from the connector ports 126 and 130. Like the previous inter-panel electrical connectors, the inter-panel electrical connector 122 may include an attaching means, such as bracket 132, for attaching to a post. The inter-panel electrical connector 122 likewise includes a notches 131 for engaging latching arms, of a harness end connector port.

Referring to FIG. 9, the three-way inter-panel electrical connector 122 is depicted providing electrical interconnection between wall panel units 134, 136 and 138 having channels therein 140, 142 and 144, respectively. Also shown here is a skeletal member 146 to which the bracket 132 of the three-way inter-panel electrical connector 122 may be attached.

In FIG. 10 is depicted a four-way inter-panel electrical connector 150. The four-way inter-panel electrical connector 150 includes a body 152 and harness connector ports 154, 156, 158 and 160. The harness connector ports 154, 156, 158 and 160 are oriented in four perpendicular directions to provide for electric distribution in a four-way connection of wall panel units. Like the previously described inter-panel electrical connectors, the four-way inter-panel electrical connector 150 may include an attaching means, such as brackets 162 and 164 for attaching to a skeletal member.

In FIG. 11, the four-way inter-panel electrical connector 150 is depicted providing an electrical interconnection between wall panel units 166, 168, 170 and 172 joined in an X configuration and having harness ends 174, 176, 178 and 180, retained therein, respectively.

As further shown in FIG. 1, the skeletal post or member 146 may, but does not necessarily, extend substantially the entire height of the wall panel units and may serve to be adapted as a structural member used in conjunction with the interconnection of frames 20 and 22 of wall panel units 12 and 14. The skeletal member 146 may be positioned inside a substantially hollow housing 147 (e.g. FIG. 9) located between the adjacent wall panel units. The bracket 132 may provide for attachment of the inter-panel electrical connector 122 to the skeletal member 146 by means of a threaded screw or other attaching device that can engage the skeletal member 146 at various heights along the height of the skeletal member. Other fastening devices, such as clamps, springs, pegs, pins or the like may be used with the fastener 132.

Another embodiment of the power distribution server is depicted in FIG. 12. This embodiment is an integrated power distribution server 190. The integrated power distribution server 190 includes power distribution server ports 192, flexible harnesses 194 and 196 connected to the ports 192, and a pair of dual harness end connector ports 198 and 200 preferably permanently attached to the flexible harnesses. Each dual harness end connector port includes two ports matable with ports of adjacent harnesses. The dual harness end connector ports 198 and 200 are similar in configuration to the three-way inter-panel electrical connector 122, described above, except that the dual harness end connector ports 198 and 200 are permanently attached to the harnesses 194 and 196, respectively, and may be molded or otherwise attached thereto as part of the manufacturing process. Like the harness end connector ports of the previous embodiments, the harness end connector ports that are oriented in the same direction as the harness also include latching arms and notches for making secure connections in the direction of the harnesses. Each dual harness end connector port oriented orthogonally to the harness direction includes side notches and detents 199 for securing to adjacent ports.

As can be seen from FIG. 13, the integrated power distribution server 190 can be utilized to make all the usual electrical connections required in an assembly of wall panel units. A longitudinal connection between wall panel units, such as at junction 202, can be made by connection of dual harness end connector ports 204 and 206. Note that at the junction 202, all the ports of the harness ends may not be used. However, this in no way detracts from their operation.

The integrated power distribution server can be used to make a right angle, such as at a junction 208, by connection of dual harness end connector ports 212 and 214. Again, two ports will remain unutilized when this connection is made.

A three-way connection is made at junction 216. There, dual harness and connector ports 220, 222 and 224 are interconnected. It can readily be observed that a fourth wall panel unit could be added at junction 216 because of the availability of additional unused ports.

Where a wall panel unit terminates without connection to another wall panel unit, the dual harness end connector port can be tucked inside the edge of the wall panel unit. Such an arrangement is depicted at end 230 wherein a wall 232 terminates without further connection. The dual harness end connector port 234 remains inside wall panel end 230 of the wall panel unit. The availability of this available extra dual harness end connector port can be advantageous in the event these wall panel units are aligned and reconfigured. Since the dual harness end connector ports are already positioned inside the wall panel units, additional wall panel units can readily be added at point 230.

By providing a permanently attached dual harness end connector port as part of an integrated power distribution server, the assembly can be standardized and the number of different parts can be thereby minimized. In addition, because the dual harness end connector port is standardized as part of an integrated power distribution server, the parts necessary for providing electrical service to the wall panel units are necessarily at hand during assembly and even during reassembly.

Referring again to FIG. 1, although not depicted in the figure, means may be provided for interconnection of the electrical cabling in the lower passageways 32 and 36 with the cabling in the belt line passageways 34 and 38 or with other passageways, if present. Such interconnection may be provided by a vertical electrical interconnection harness or other hardware that is adaptable with the harness end connector ports used to provide inter-panel electrical connection.

Referring to FIG. 14–16, the interconnection of adjacent wall panel units in accordance with the present invention is depicted. The interconnection of wall panel units as described herein may be adapted in particular with the interconnection and distribution of the electrical service between wall panel units as described above However the means for interconnection of wall panel units, as described herein, may be adapted and utilized in conjunction with wall panel systems having different means for electrical distribution or with wall panel system that do not include electrical distribution at all.

The means for interconnection of a wall panel system can be used to connect two, three, or four wall panel units together As mentioned above, it is necessary occasionally that two, three, or four wall panel units meet at a single location In previous wall panel unit designs, at least some different connecting hardware was necessary depending upon whether two three, or four wall panel units were being connected together. This necessitated having sufficient inventories of each on hand when a system of wall panels was being assembled and also presented the problem of maintaining a sufficient inventory of the various pieces on hand in case the wall panel system was reconfigured. Thus, in order to be sure that the proper pieces were on hand, sufficient supplies of all the pieces were stocked even though it was known that not all the pieces would be used.

The invention disclosed herein for the interconnection of wall panel units addresses the problem of incompatible hardware and surplus inventory supplies with a system that allows for the connection of two, three, or four wall panel units using the same hardware, A skeletal post 300 is positioned and located between the wall panel units to be interconnected when three or four wall panels are to be joined and may be used when two wall panels units are to be joined, as explained below. The skeletal post may be a square tube made of a rigid, durable material, such as steel, however, other shapes or materials may also be suitable. The skeletal post would typically have dimensions that are narrower than the thickness of the wall panel units to allow for covering the skeletal post with a trim piece (e.g. 147 in FIG. 9) on any side of the skeletal post to which a wall panel unit is not connected. Preferably the skeletal post is $1\frac{1}{4}$ inches square and has a height that conforms to or is less than to the dimensions of the wall panel units being interconnected. In addition, if the wall panel system includes an electrical distribution system, additional space around the skeletal post between the skeletal post and the edge of the wall panel unit can be utilized for the location of electrical cabling or for receptacle end connectors or for inter-panel electrical connectors, as described above.

The interconnection of wall panel units includes separate connections at a location of the each wall unit toward the upper portion thereof and at a location toward the lower portion thereof. These connections involve different types of connecting components, as explained below.

To the skeletal post 300, there is connected a top plate 308. This connection may be by means of a fastener such as a bolt or the like. A wedge shaped component 312 is attached by fasteners 316 to the top plate 308. The fasteners 316 may be threaded fasteners such as bolts that can pass through openings in the top plate 308 and engage threaded openings in the wedge shaped component 312. One wedge shaped component is used for each connection of a wall panel unit to the top plate. The wedge shaped component may be made of a suitably durable material, such as forged steel, although other materials may likewise be suitable. The wedge shaped component 312 is connected to the top plate 308 oriented in the direction of the wall panel unit 304 to be connected. The bottom of the wedge shaped component is tapered in a direction away from the wall panel unit, as shown in FIG. 14. The wall panel unit to be connected includes a slot or opening 322 at a location toward the upper portion thereof and aligned with the tapered section of the wedge shaped component.

Referring to FIG. 15 at a lower portion of the skeletal post are connected hook members 344 and 346. These hook members are connected by fastening means such as bolts to the skeletal post. These hook members are upwardly oriented hook ends that engage a second slot 349 in the side of the vertical member of the frame at a location in a lower portion thereof.

Again, referring to FIG. 15, connected to the hook members is a base plate 342. The base plate may be a metal plate extending horizontally from the skeletal post preferably not entirely all the way to an adjacent wall panel unit. The base plate 342 includes slots 348 on each side of the skeletal post 300 for the connection of brackets or other hardware, such as brackets 348 of inter-panel electrical connector 350. The base plate 342 may serve to protect the electrical connector.

To secure a wall panel unit to the skeletal post, a wall panel unit is positioned over the hook member to secure the lower portion of the wall panel unit thereto. The wall panel unit need not necessarily be bolted at the bottom as its weight is sufficient to prevent it from coming off the hook member.

To secure the upper portion of the wall panel unit to the top plate a draw nut 326 is tightened by a bobbin screw 330 against the wedge shaped component and the edge of the opening in the vertical frame member of the wall panel unit. The draw nut may be saddle shaped having upwardly extending tapered end portions on either end thereof as depicted in FIG. 14. These end portions conform to the wedge shaped portion and the wall panel unit opening. The draw nut is made of a suitably durable material, such as forged steel although other materials may be used as well. Because of the tapered shapes of the draw nut, wedge shaped component, and wall panel unit opening, tightening the bobbin screw secures the wall panel unit to the top plate. A bracket 334 attached to the skeletal post 300 retains the bobbin screw/draw nut assembly. The L shaped bracket may be suitably secured to the skeletal post by means of fasteners such as pegs, pins, bolts, screws, etc.

Because the connection of one wall panel unit to another is through the wedge shaped component, if it is desired to reconfigure the wall panel system, all that is necessary is to bolt on (or unbolt) another wedge shaped component to the top plate for the wall panel unit to be added (or removed) at the upper portion thereof and a hook member at the lower portion thereof. Referring to FIG. 16, there is depicted a top view of the skeletal member 300, top plate 308, and other hardware for the interconnection of three wall panel units. (The wall panel units are not shown). Three wedge shaped components 312, 335, and 336 are connected to top plate 308 by fasteners, 337. The wedge shaped components are preferably identical pieces that can be used in any orientation. The wedge shaped components 312, 335, and 336 are engaged by the draw nuts, 326, 338, and 339, respectively, and tightened by bobbin screws 330, 340, and 341, respectively. Thus, a supply of hardware for the connection of wall panel units need only include a sufficient supply of wedge shaped components (and other hardware such as the draw nuts, bobbin screws, etc.) which can be used for the interconnection of wall panel units of any configuration.

A significant advantage of the present invention is that the same components may be used for interconnection of two adjacent wall panel units aligned end to end whether a skeletal post is used or is omitted. When two wall units are aligned end to end, a skeletal post may be used, for instance as shown in FIG. 1, or may be omitted, as shown in FIG. 5. The choice is sometimes optional or sometimes may be dictated by the configuration of adjacent wall panel units. For instance, if a three way interpanel connection (which requires the skeletal post) is made on parallel series of wall panel units, use of the skeletal post member may be required (either structurally or aesthetically) in order to make parallel ends line up. If the skeletal post is not required, the draw nut may be used in conjunction with a bottom hook to connect together adjacent wall panel units. FIG. 5 illustrates the top view of such a panel to panel connection. In FIG. 5, the adjacent panels are connected by a draw nut 370 and bolt 372. As in the previously described embodiments, the draw nut engages slots located in the vertical members of the frames of adjacent wall panel units 94 and 96. The bottom hook is attached to the vertical members of the frames by means of a fastener, preferably a bolt threaded into a hole in the hook. These hook members are upwardly oriented to engage a second slot in the side of the vertical frame member of the frame at a location in a lower portion thereof. The draw nut is common to all types of panel connections, with or without the skeletal post thus like components may be used.

As previously mentioned, because the skeletal post 300 is narrower than the wall panel units (and the junction thereof), there is sufficient space around the skeletal post for electrical cabling or electrical connection units, such as the inter-panel electrical connector 350 as depicted in FIG. 15. Moreover, the dimensions of the skeletal post readily provide for other service distributions between wall panel units, such as telephone wiring, computer cabling, etc. In addition to the distribution between wall panel units of electrical service as shown in FIGS. 1 and 15 (or telephone and computer service), the dimensions of the skeletal member also provide sufficient room to allow for the distribution of such services form the top or bottom, such as from the wall or ceiling. This allows for an initial connection of a wall panel system to a permanent service system or for the transmission of service from one wall panel system to another or to a free standing wall panel system not readily accessible from an adjacent permanent wall.

Although the wall panel units depicted in FIG. 15 show the electrical connection distribution associated with the base plate, the electrical distribution can be accomplished at various heights along the skeletal post. The electrical distribution may be made at a belt line height, such as depicted in FIG. 1, or at other heights.

It is intended that the foregoing detailed description be regarded as illustrative rather than limiting and that it be understood that it is the following claims, including all equivalents, which are intended to define the scope of the invention.

We claim:

1. An electrified wall panel system comprising:
   at least two wall panel units;
   a wall panel unit connector including means for releasably connecting adjacent ends of said two wall panel units, said wall panel unit connector further including a vertical skeletal post within said wall panel unit connector and housing means spaced around said skeletal post;
   power distribution means within each of said two wall panel units each including a wire harness which extends to the end of the respective wall panel unit; and
   inter-panel electrical connector with at least a first and second connector port matable with end connector ports of said wire harnesses for electrically connecting the wire harnesses of the two wall panel units, said inter-panel electrical connector comprising attaching means for releasable attachment to the skeletal post, whereby said inter-panel electrical connector can be attached to said skeletal post within said housing means and at various heights along the skeletal post.

2. The electrified wall panel system of claim 1 in which the two connector ports of said inter-panel electrical connector are oriented so that the first connector port is oriented 180 degrees away from the second connector port to thereby enable electrical connection between wall panel units joined end to end longitudinally.

3. The electrified wall panel system of claim 1 in which the two connector ports of said inter-panel electrical connector means are oriented so that the first port is oriented 90 degrees away from the second connector port to thereby enable electrical connection between wall panel units joined at a right angle.

4. The electrified wall panel system of claim 1 wherein the inter-panel electrical connector further comprises a third connector port and wherein the first connector port is oriented 180 degrees away from the second connector port and the third connector port is oriented 90 degrees away from the second connector port to thereby enable electrical connection between three wall panel units joined in a T configuration.

5. The electrified wall panel system of claim 1 wherein the inter-panel electrical connector further comprises a third and fourth connector port and wherein the first connector port is oriented 180 degrees away form the second connector port, the third connector port is oriented 90 degrees away from the second connector port, and the fourth connector port is oriented 180 degrees away from the third connector port to thereby enable electrical connection between four wall panel units joined in an X configuration.

* * * * *